United States Patent
Koves

[11] Patent Number: 5,143,698
[45] Date of Patent: Sep. 1, 1992

[54] APPARATUS FOR INTERNAL BACKMIX COOLING

[75] Inventor: William J. Koves, Hoffman Estates, Ill.

[73] Assignee: UOP, Des Plaines, Ill.

[21] Appl. No.: 488,920

[22] Filed: Mar. 5, 1990

[51] Int. Cl.$^5$ ............................ F27B 15/16; B01J 8/20
[52] U.S. Cl. .................................. 422/144; 422/140; 422/141; 422/145; 422/146; 431/7
[58] Field of Search ............................ 422/141–146, 422/140; 165/104.16; 34/57 A; 122/4 D; 110/245; 431/7, 170

[56] References Cited

U.S. PATENT DOCUMENTS

| | | | |
|---|---|---|---|
| 2,395,263 | 2/1946 | Foster | 422/142 X |
| 2,431,630 | 11/1947 | Arveson | 252/417 |
| 2,458,435 | 1/1949 | Simpson | 252/418 |
| 2,584,391 | 2/1952 | Leffer | 422/143 |
| 2,879,145 | 3/1959 | Rice | 422/145 X |
| 2,885,272 | 5/1959 | Kimberlin, Jr. et al. | 422/140 |
| 2,910,425 | 10/1959 | Cabbage | 422/140 X |
| 2,926,143 | 2/1960 | Leland | 252/417 |
| 2,995,426 | 8/1961 | Keith | 23/288 |
| 3,142,544 | 7/1964 | Martin et al. | 422/144 |
| 3,690,841 | 9/1972 | Bunn, Jr. et al. | 422/144 |
| 3,990,992 | 11/1976 | McKinney | 252/417 |
| 4,243,634 | 1/1981 | Vickers | 422/144 |
| 4,247,518 | 1/1981 | Charlet et al. | 422/142 |
| 4,353,812 | 10/1982 | Lomas et al. | 252/417 |
| 4,364,849 | 12/1982 | Vickers et al. | 252/417 |
| 4,430,300 | 2/1984 | Vickers | 422/109 |
| 4,430,302 | 2/1984 | Krause | 422/144 |
| 4,464,247 | 8/1984 | Thacker | 422/142 X |
| 4,475,884 | 10/1984 | Shang et al. | 422/145 X |
| 4,690,802 | 9/1987 | Jenkinson | 422/144 X |

*Primary Examiner*—Robert J. Warden
*Assistant Examiner*—Amalia Santiago
*Attorney, Agent, or Firm*—Thomas K. McBride; John G. Tolomei

[57] ABSTRACT

An arrangement is provided for locating internal cooling coils in an FCC regeneration zone that allows control of the cooling coil wall temperature independently of the regeneration zone operation and the circulation rate of cooling fluid through the cooling conduits. The cooling conduits are located within a vessel that contains the combustion section for an FCC regeneration zone. The cooling coils are in a chamber that is closed to catalyst transfer across all of its boundaries except its top. The level of hot regenerated catalyst within the regeneration zone is maintained above the top of the cooling chamber. The addition of flue gas to a lower portion of the cooling chamber provides a random exchange of catalyst particles between the layer of the catalyst bed above the chamber and catalyst within the chamber. By controlling the rate of fluidizing gas addition to the chamber, the rate of exchange of hot catalyst between the chamber and the bed is also controlled. Throttling back the flow of fluidizing gas to the chamber reduces the amount of heat transfer from the catalyst, thereby lowering the wall temperature of the cooling conduits for a constant circulation rate of cooling fluid. The cooling chamber is arranged such that a stagnant layer of catalyst surrounds the cooling coils when the flow of fluidizing gas is cut off. In this way, the cooling conduits can be maintained indefinitely within an operating regeneration zone without the circulation of cooling fluid. Such an operation is particularly advantageous during start-up when the regeneration zone is being heated to initiate the combustion of coke in the regeneration operation.

1 Claim, 3 Drawing Sheets

APPARATUS FOR INTERNAL BACKMIX COOLING

BACKGROUND OF THE INVENTION

The field of art to which this invention pertains is fluid catalyst regeneration. It relates to the rejuvenation of particulated-solid, fluidizable catalyst which has been deactivated by the deposition thereupon of coke. The present invention will be most useful in a process for regenerating coke-contaminated fluid cracking catalyst, but it should find use in any process in which coke is burned from a solid, particulated fluidizable catalyst.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen-containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke-free, catalyst.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e., catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate an increase in the rate of flow of circulating fluid catalyst from the regenerator to the reactor is effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that: this higher catalyst circulation rate is sustainable by virtue of the system being a closed circuit; and, the higher reactor temperature is sustainable by virtue of the fact that increased reactor temperatures, once effected, produce an increase in the amount of coke being formed by the reaction and deposited upon the catalyst. This increased production of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also high levels of combined nitrogen, such as is found in shale derived oils, will also increase the coke level on spent catalyst. The processing of heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1350° F. since loss of activity would be very severe above 1400°-1450° F. If a relatively common reduced crude such as that derived from Light Arabian crude oil were charged to a conventional FCC unit, and operated at a temperature required for high conversion to lighter products, i.e., similar to that for a gas oil charge, the regenerator temperature would operate in the range of 1600°-1800° F. This would be too high a temperature for the catalyst, require very expensive materials of construction, and give an extremely low catalyst circulation rate. It is, therefore, accepted that when materials are processed that would give excessive regenerator temperatures, a means must be provided for removing heat from the regenerator, which enables a lower regenerator temperature, and a lower temperature difference between the reactor and the regenerator.

Prior art methods of heat removal generally provide coolant-filled coils within the regenerator, which coils are in contact either with the catalyst from which coke is being removed or with the flue gas just prior to the flue gas exit from the regenerator. For example, McKinney, U.S. Pat. No. 3,990,992, discloses a fluid catalytic cracking process having a dual zone regenerator with cooling coils mounted in the second zone. The second zone is for catalyst disengagement prior to passing the flue gas from the system and contains catalyst in a dilute phase. Coolant flowing through the coils absorbs heat and removes it from the regenerator.

The use of heat transfer elements such as U-tube shaped heating coils within a fluidized reactor is also well known in the art. U.S. Pat. No. 2,995,426, issued to P. C. Keith, illustrates such a heat removal design, with the heat exchangers being utilized to supply heat to the fluidized bed of particulate material. In this apparatus the manifold system which supplies and withdraws the heat exchange media is located within the main vessel of the reactor.

U.S. Pat. No. 2,458,435, issued to T. P. Simpson, illustrates an apparatus for regenerating a moving bed of contact material wherein the heat exchange media is caused to pass through horizontal U-tubes which extend into the main vessel of the apparatus through a rather complex manifold system located outside of the reaction vessel.

U.S. Pat. No. 2,431,630, issued to M. H. Arbeson, illustrates the use of heat exchange coils within the catalyst regeneration chamber of a fluidized catalytic cracking process. The coolant passes into an external manifold which distributes it to the various vertical heat exchange means located within the regeneration vessel and through which the coolant passed upward to a collection manifold located above the cooling coils.

U.S. Pat. No. 2,926,143, issued to M. B. Leland, illustrates a rather complex cooling system for use within a catalyst regeneration vessel. The heat exchange coils are suspended from the coolant distribution and collection manifolds which are located within the regenerator vessel but which are linked together externally.

U.S. Pat. Nos. 4,243,634 and 4,430,300, issued to A. G. Vickers, are pertinent for its illustration of the use of steam coils as heat removal apparatus within the catalyst regeneration zone of a modern fluidized catalytic cracking process.

Many of these prior art coils have been found to be inflexible in that they are usually sized to remove the quantity of heat which will be liberated by the prospective feedstock which is most extensively coke-forming. Difficulties arise when a feedstock of lesser coke-forming characteristics is processed. In such a case, the heat removal coils are now oversized for the job at hand. They, consequently, remove entirely too much heat. When heat removal from the regenerator is higher than that required for a particular operation, the temperature within the regenerator is depressed. This leads to a lower than desired temperature of regenerated catalyst exiting the regenerator. The catalyst circulation rate required to obtain the desired reaction zone temperature will increase, and may exceed the mechanical limitations of the equipment. The coke production rate will be higher than necessary on this feedstock, and the lower temperature will result in less efficient coke burning in the regeneration zone, with a greater amount of residual coke on regenerated catalyst. Such are the operational difficulties caused by prior art heat removal means due to their inflexibility.

Indeed, these prior art heat removal schemes also significantly complicate the start-up of prior art units. The presence of inflexible heat removal coils within the coke-oxidizing section of the regenerator often drastically extends the time period required for raising the regenerator to its operational temperature level.

It is also well known to use heat coils for the dense phase cooling of a regenerated catalyst bed. One such dense phase cooling zone shown in U.S. Pat. No. 4,430,302, issued to B. J. Krause, shows flexible tubes in the combustion zone of an FCC regenerator. Having the tubes in the dense bed of the combustion zone jeopardizes the integrity of the tubes while starting up or shutting down the units. In addition, severe tube damage could result if cooling water circulation was lost and the tubes were heated to the full combustion zone temperature.

In order to avoid these problems, dense phase catalyst cooling has been carried out in remote cooling zones such as shown in U.S. Pat. No. 4,353,812, issued to Lomas et al. Although remote coolers improve heat removal and cooling zone temperature control, providing a separate vessel and external catalyst circulation increases the cost and complexity of the heat removal section.

A remote cooler of reduced complexity is shown in U.S. Pat. No. 4,364,849, issued to Vickers. This remote cooler exchanges catalyst with the regeneration zone through a single large transfer line by random exchange of particles. Circulation of the catalyst particles in this manner has been referred to as a backmix operation. Heat removal in the backmix cooler is controlled by adjusting the rate of cooling gas circulation through the cooler. Although the remote backmix cooler offers a simplified design and operation, heat removal capacity is appreciably lower than that offered by other catalyst coolers.

It is an object of this invention to provide a more flexible cooler in a regeneration zone.

It is a further object of this invention to provide heat removal coils within a regeneration zone that can tolerate a wide range of processing conditions and operational upsets.

A further object of this invention is to provide an apparatus for removing heat from a regeneration vessel that is simple in design and easy to operate.

SUMMARY OF THE INVENTION

These objectives are attained by the use of an apparatus that forms a separate chamber within the regeneration zone for containing the heat removal coils. The chamber is characterized by sides and a bottom that are substantially closed to catalyst flow with the only communication of catalyst between the regeneration zone and the cooling chamber occurring over the uppermost portion of the cooling chamber. The cooling chamber has a location below the top surface of a dense catalyst bed. All exchange of catalyst between the cooling chamber and a catalyst retention space of the regeneration zone is controlled by the addition of fluidizing gas to the cooling chamber. The amount of heat removed by the cooling coils in the cooling chamber can be controlled directly by adjusting the rate of cooling fluid through the cooling coils and indirectly by adjusting the addition of fluidizing gas to the cooling chamber thereby altering the catalyst circulation and the resulting heat available for removal by the coils. Thus, this apparatus allows a cooling coil temperature to be controlled independently of the temperature in the dense bed of the regeneration zone. For example, the cooling coils may be operated at a minimum temperature by circulating a large amount of coolant through the coils while using a relatively low addition of fluidizing gas into the cooling chamber so that the heat available as well and the tube walls can be kept relatively cold. Moreover, during start-up conditions, when heat is added to the regeneration zone to initiate coke combustion, the flow of fluidizing gas to the cooling chamber can be stopped altogether to minimize the removal of heat from the cooling coils while maintaining a circulation of cooling fluid to maintain a low cooling coil temperature during start-up. The ability to isolate the cooling chamber and prevent the transfer of hot catalyst from the regeneration zone into the cooling chamber provides the apparatus of this invention with all of the advantages of a backmix operation. However, by having the cooling coils within the regeneration zone and more specifically within a dense bed of catalyst therein, a high catalyst temperature can be maintained in the cooling chamber when desired. With a high circulation rate of hot catalyst in the cooling chamber the cooling coils can provide a high heat removal rate that controls temperatures within the regeneration zone when large amounts of coke are combusted. Therefore, the cooling coils of this invention offer all the advantages of a remote backmix cooler without its limitations on heat removal.

Another advantage of this invention is its very simple arrangement. The apparatus has a very simple structure and a very simple manner of operating. The partitions or baffles needed to create the chamber requires the use only basic plate elements and ordinary assembly. When in use its operation provides little or no danger of damage to the coolant tubes, erosion to the partitions or tubes, or a loss of catalyst circulation.

Accordingly, in one embodiment, this invention is an apparatus for regenerating fluidized catalyst by the combustion of coke and the removing of heat generated by the coke combustion. The apparatus includes a vertically-oriented regeneration vessel and a partition within the regeneration vessel. The partition divides the interior of the regenerator to provide a vertically-oriented cooling chamber and a hot catalyst retention chamber. The partition provides open communication between the top of the cooling chamber and the top of the retention chamber. The cooling chamber has sides and a bottom that restrict catalyst transfer between the retention chamber and the cooling chamber. Conduits within the cooling chamber circulate a cooling fluid in indirect heat exchange with the interior of the cooling chamber. The apparatus includes means for introducing a fluidizing gas into at least a lower portion of the chamber, means for adding fluidizing gas to the retention chamber and means for adding catalyst particles to and withdrawing catalyst particles from the catalyst retention chamber.

In another embodiment, this invention is again an apparatus for regenerating fluidized catalyst by the combustion of coke and removing heat generated by the coke combustion. The apparatus includes a cylindrical partition located inside and along a vertical axis of a regeneration vessel. The partition divides the interior of the vessel into a central combustion chamber and an outer cooling chamber. The partition has a height less than the height of the vessel to provide an upper volume that is in open communication with the combustion chamber and the cooling chamber in the top of the regeneration vessel. The cooling chamber has sides and a bottom that are substantially closed to catalyst flow. Cooling coils in the cooling chamber circulate a cooling fluid through the interior of the coils and indirectly exchange heat with the interior of the chamber. A regeneration gas distributer is located in a lower portion of the regeneration vessel for distributing regeneration gas about the combustion chamber. A fluidizing gas distributor distributes fluidizing gas about the cooling chamber. A gas outlet withdraws fluidizing gas and stripping gas from the upper volume of the regeneration vessel. Coke containing catalyst is supplied to the regeneration vessel through a catalyst inlet and a catalyst outlet withdraws catalyst particles from the combustion chamber.

Other objects, embodiments and details of this invention are disclosed in the following detailed description of the invention.

DETAILED DESCRIPTION OF THE INVENTION

This invention can be used in most regeneration processes that operate with a dense bed of fluidized catalyst. In regeneration zones that operate with multiple stages of catalyst regeneration, such regeneration vessels can be arranged to use the apparatus of this invention in any regeneration zone that maintains a dense bed of catalyst. A wide variety of different regeneration zones are known to those skilled in the art and those skilled in the art can appreciate ways in which such regeneration zones can be modified to incorporate the apparatus of this invention from the description that follows.

Figure 1:
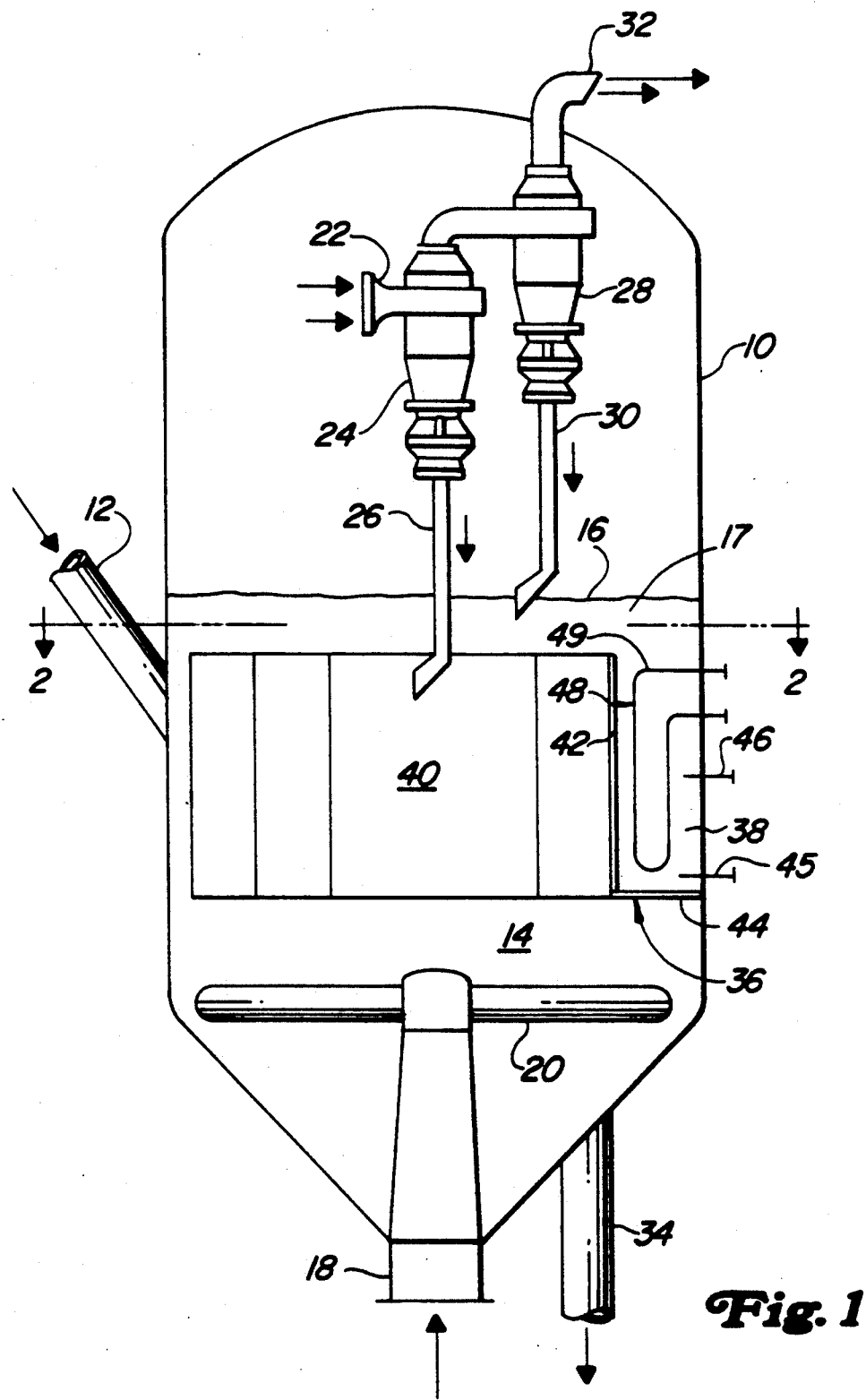
FIG. 1 is a schematic diagram showing a cross-section of a regeneration vessel arranged in accordance with this invention.

FIG. 1 shows a simple regeneration zone that operates with a single dense bed for the combustion of coke from the catalyst. Regenerated catalyst enters a regeneration vessel 10 through a spent catalyst conduit 12. As catalyst enters from conduit 12, it becomes mixed with the catalyst inventory in a bed of catalyst 14 having an upper bed surface 16. Oxygen-containing regeneration gas, usually air, enters regeneration vessel 10 through a nozzle 18 and is distributed across bed 14 through a distributor 20. Air passes upwardly through the bed at sufficient velocity to keep the bed 14 in a dense fluidized state. Gas leaving the upper bed surface 16 entrains catalyst particles so that the region above bed surface 16 contains dilute phase catalyst. The dilute phase catalyst and gas enters an inlet 22 of a cyclone separator 24 that separates small catalyst particles from the gas stream, returns the particles to catalyst bed 14 by conduit 26, and transfers the gas into a second cyclone 28. Cyclone 28 removes additional fine particles from the flue gas and returns these particles to catalyst bed 14 through a conduit 30 while relatively catalyst-free flue gas is withdrawn from the top of the regenerator 10 by nozzle 32. Regenerated catalyst particles having a reduced amount of coke are withdrawn from the bottom of the regeneration vessel 10 by a catalyst conduit 34.

Catalyst is regenerated in the dense bed 14 of the regeneration zone by the combustion of coke with the oxygen-containing gas from distributor 20. The rate at which the oxygen-containing gas or air is mixed with the catalyst also controls the density of bed 14. The terminology "a dense bed" is meant to describe catalyst bed as having a density of at least 20 lbs. per cubic foot. The density of bed 14 is kept relatively high to promote the exchange of catalyst between the dense bed and the interior of a partition 36.

Partition 36 divides the dense bed 14 into a cooling chamber 38 and a retention chamber 40. The partition 36 has a baffle 42 that extends principally vertically within the dense bed 14. Partition 42 is supported from the side of the regeneration vessel by a bottom section 44. Bottom section 44 consists of a flat partially annular plate that extends around most of the outer circumference of the vessel. Both the baffle and the bottom section 44 are substantially impervious to catalyst flow across the top of the cooling chamber.

FIG. 1 shows the hot catalyst retention chamber 40 in the center of bed 14 and cooling chamber 38 in an annular area surrounding the center of the vessel. Retention chamber 40 can serve as a combustion zone as shown in FIG. 1 or as a repository for hot catalyst particles that are transferred from a preceding stage of regeneration. When combustion takes place within dense bed 14, chamber 40 is referred to as a combustion chamber. It is not essential to the invention that the retention chamber 40 be located in the central portion of the vessel, and the relative locations of the cooling chamber and retention chamber may be reversed such that the cooling chamber is in a central portion of the vessel and an outer annular area serves as a retention chamber or combustion chamber.

The vertical portion of partition 42 is located below the upper bed surface 16. The bed surface 16 is generally maintained above the top of baffle 42 to interchange catalyst between the cooling chamber and the retention chamber in the layer of the bed 17 located above baffle 42 and below surface 16. The interchange of catalyst between the cooling chamber and the catalyst in layer 17 is controlled by the amount of fluidizing gas added through a pair of nozzles 45 and 46. As the flow of fluidizing gas to nozzles 45 and 46 is increased, catalyst in cooling chamber 38 becomes increasingly turbulent so that a random mixing of catalyst particles between layer 17 and chamber 38 increasingly occurs. The opposite effect can be attained by stopping the catalyst flow through nozzles 45 and 46 so that essentially no interchange of catalyst occurs between cooling chamber 38 and layer 17. Without a flow of fluidizing gas, catalyst in cooling chamber 38 becomes stagnant.

It is not necessary to locate the cooling chamber at any particular elevation in the retention chamber. In FIG. 1 the partition 36 is shown located a few feet above the distributor 20. The distributor could also be located at a lower elevation in the retention chamber. If the bottom of the cooling chamber is near or below the level of the distributor, the size of distributor 20 should be reduced so that it does not interfere with the cooling chamber or does not discharge fluidizing air directly below the cooling chamber.

Providing the cooling chamber in the retention chamber will reduce the open volume of the chamber and block a portion of the cross sectional area that is available for a catalyst bed and catalyst transport. This reduction in volume or cross-sectional area will generally pose no problem in incorporating the cooling chamber into a new or existing retention chamber. In fact, the reduction in cross sectional area can improve the operation of some older regenerators by increasing the velocity of the catalyst as it flows upward through the regeneration zone which in turn increases catalyst and air mixing to facilitate coke burning. Therefore the addition of the cooling chamber can provide the two fold benefit of improving regeneration while providing a means to cool catalyst.

The interchange of catalyst into cooling chamber 38 directly determines the amount of heat available for removal by a group of cooling coils 48 that are routed through cooling chamber 38. When a large amount of fluidizing gas is added to chamber 38, the degree of backmixing between layer 17 and chamber 38 is high and a large heat input is available from the catalyst for removal by the cooling coils. By circulating a large amount of cooling fluid through the coils 48, the cooling chamber 38 offers a high heat removal capacity that can substantially lower the temperature of the regeneration zone to acceptable limits. If less heat removal is desired, the most effective way of reducing heat exchange is to reduce the addition of fluidizing gas. The effective heat transfer coefficient between the catalyst and tube wall surfaces of the coils is highly dependent on the addition of fluidizing gas. Moreover, the fluidizing gas addition rate also increases the circulation of hot catalyst through the cooling chamber. Therefore controlling heat removal by varying the catalyst circulation rate is highly effective since it directionally influences both the heat transfer coefficient and catalyst circulation in the same manner. Of course it is also possible to vary the heat removal by altering the circulation rate of cooling fluid through the coils 48.

As the flow of cooling fluid through coils 48 is reduced however, the addition of fluidizing gas may also need to be decreased to lower the amount of heat available for removal from cooling chamber 38 and thereby prevent overheating of the heat removal coils. Should the circulation of cooling fluid be lost for some reason, the flow of fluidizing gas can be stopped and the resulting inventory of stagnant catalyst in cooling chamber 38 will act as an insulator to protect the cooling coils from the high temperatures of the regeneration zone. The fluidized bed of catalyst offers this unique duality of properties where when highly fluidized it provides a good heat transfer coefficient for heat removal and when stagnant it serves as excellent insulation to protect the cooling coils.

The exchange of hot catalyst between the retention chamber and the cooling chamber can also be controlled in other ways. For instance, the effective length of cooling chamber 38 may be reduced by using only upper nozzle 46 for the addition of fluidizing gas. When the fluidizing gas flow through nozzle 45 is stopped, catalyst below nozzle 46 again becomes stagnant so the effective heat transfer surface of cooling coils 48 is reduced. It is also possible to choke the exchange of hot catalyst between the cooling chamber 38 and the retention chamber 40 by lowering bed level 16 such that layer 17 is restricted in depth. However, for most operations, the introduction of fluidizing gas at a single lowermost point within cooling chamber 38 and the use of a relatively constant level for bed 14 will provide adequate control of heat removal and cooling coil temperatures.

Figure 2:
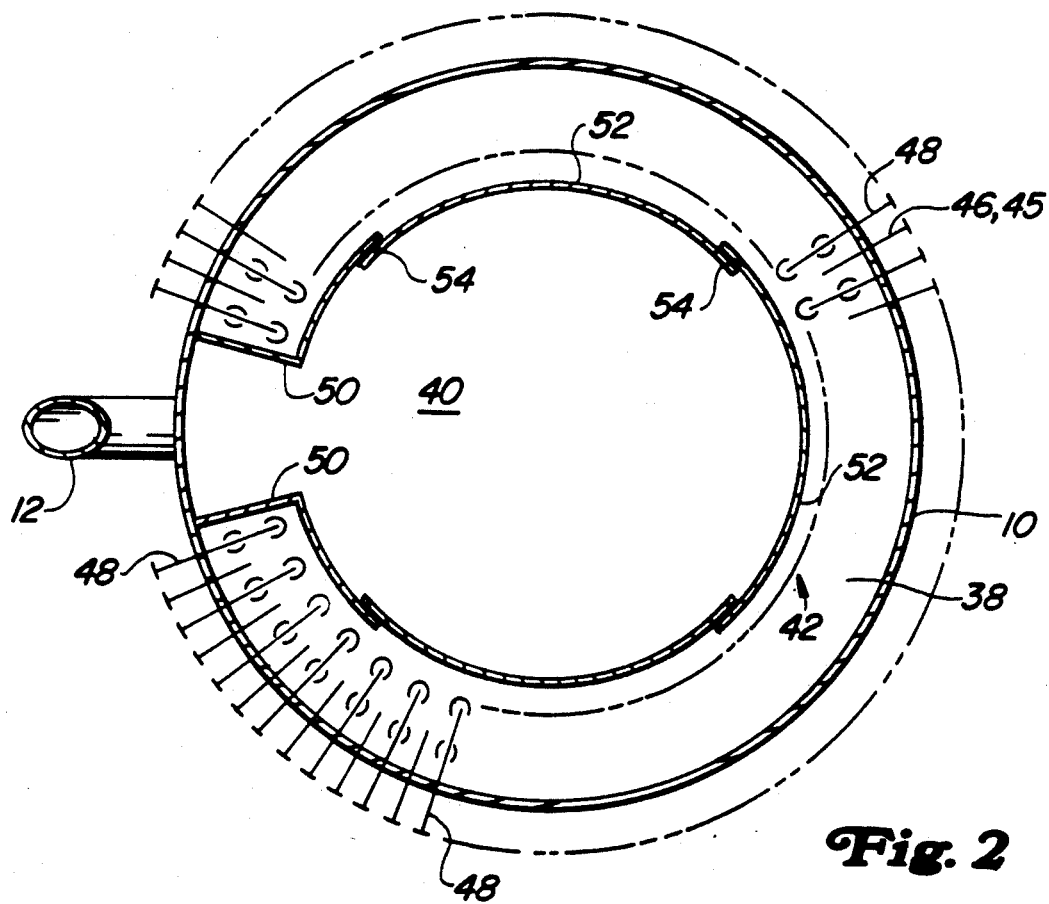
FIG. 2 is a plan view of the regenerator of FIG. 1 taken about section 2—2.

The arrangement of the partition can be more fully understood by reference to FIG. 2.

FIG. 2 is a cross-section of the regenerator of FIG. 1 that is taken at cross-section 2—2 to show a plan view of the baffle 42, the cooling chamber 38 and other internals. Vessel wall 10 and the baffle 42 define the vertical sides of chamber 38. Chamber 38 is principally annular in shape except for a small sector that is omitted to accommodate a catalyst standpipe which in this case provides the addition of catalyst from standpipe 12 but, could also be used to provide a catalyst standpipe for the withdrawal of catalyst. The annular chamber has two radially extending walls 50 that leave an open space from shell 10 to the retention chamber 40. The open sector between sidewalls 50 allows catalyst to flow from standpipe 12 into the retention chamber 40. Baffle 42 consists of a number of overlapping sections 52. The overlapping sections are provided to allow thermal expansion of the baffle 42. A design that permits thermal expansion is usually needed due to the difference in temperature between the internally insulated outer wall of vessel 10 and the sections 52. The sections 52 are attached along vertical seams with a sliding connection that will keep the sections in place but permit relative circumferential sliding between the different sections. These seams are indicated by reference numeral 54 and extend vertically along over the length of baffle 42. The seams 54 are kept relatively tight to restrict leakage of catalyst across the seams between the cooling chamber and the retention space. Therefore, even with the sliding seam, cooling chamber 38 is still substantially closed to catalyst flow except at its top.

FIG. 2 also shows the arrangement of cooling coils 48 and fluidizing gas nozzles 46, 45. The drawings illustrate the use of U-shaped coils; however, a variety of different shapes can be used for the coils. For example serpentine coils could also be used. Regardless of shape, the cooling coils are spaced around the outer circumference of the vessel. The illustrated U-shaped cooling coils usually have a circumferential spacing of between 6 to 12 inches. The cooling coils 48 usually extend radially inward from the outer wall of vessel 10 for a distance of about 12 to 18 inches. Manifold arrangements for connecting the different nozzles of cooling coils 48 are well known to those skilled in the art. A preferred manifold arrangement will distribute and collect fluid from groups or banks of nozzles so that different banks of cooling coils can be independently controlled. The independent control of different banks of cooling coils allows heat removal to be adjusted around the regenerator circumference and banks of cooling coils to be independently shut down while permitting other coils to continue operation. A multiplicity of fluidizing gas inlet nozzles 46 and 45 are spaced between cooling coils 48. FIG. 2 shows fluidizing gas inlet nozzles spaced between every pair of cooling coils. Using a large number of fluidizing gas inlets provides a good distribution of fluidizing gas around the circumference of cooling chamber 38. Using a large number of nozzles also reduces the flow of fluidizing gas to each individual nozzle. It is desirable to keep the amount of fluidizing gas added by each nozzle low in order to reduce gas velocities which can lead to erosion of the cooling coils or the baffle. Nevertheless, where it is desirable to increase the number of cooling coils, a reduced spacing of fluidizing nozzles can also be used. For example, placing fluidizing gas inlet nozzles between every two cooling coils is also possible. Where only one level of fluidizing gas inlet nozzles are used it is also possible to place the fluidizing gas nozzles below the cooling coils so that spacing between coils can be further reduced.

The uppermost portion 49 of cooling coil 48 is positioned below the top of baffle 42. Location of the uppermost portion of the cooling coils below baffle 42 allows an insulating layer of stagnant catalyst to be formed which acts as an insulator to shield the coils from high temperatures in the catalyst retention chamber when the flow of cooling fluid through the coils is reduced or stopped.

Figure 3:
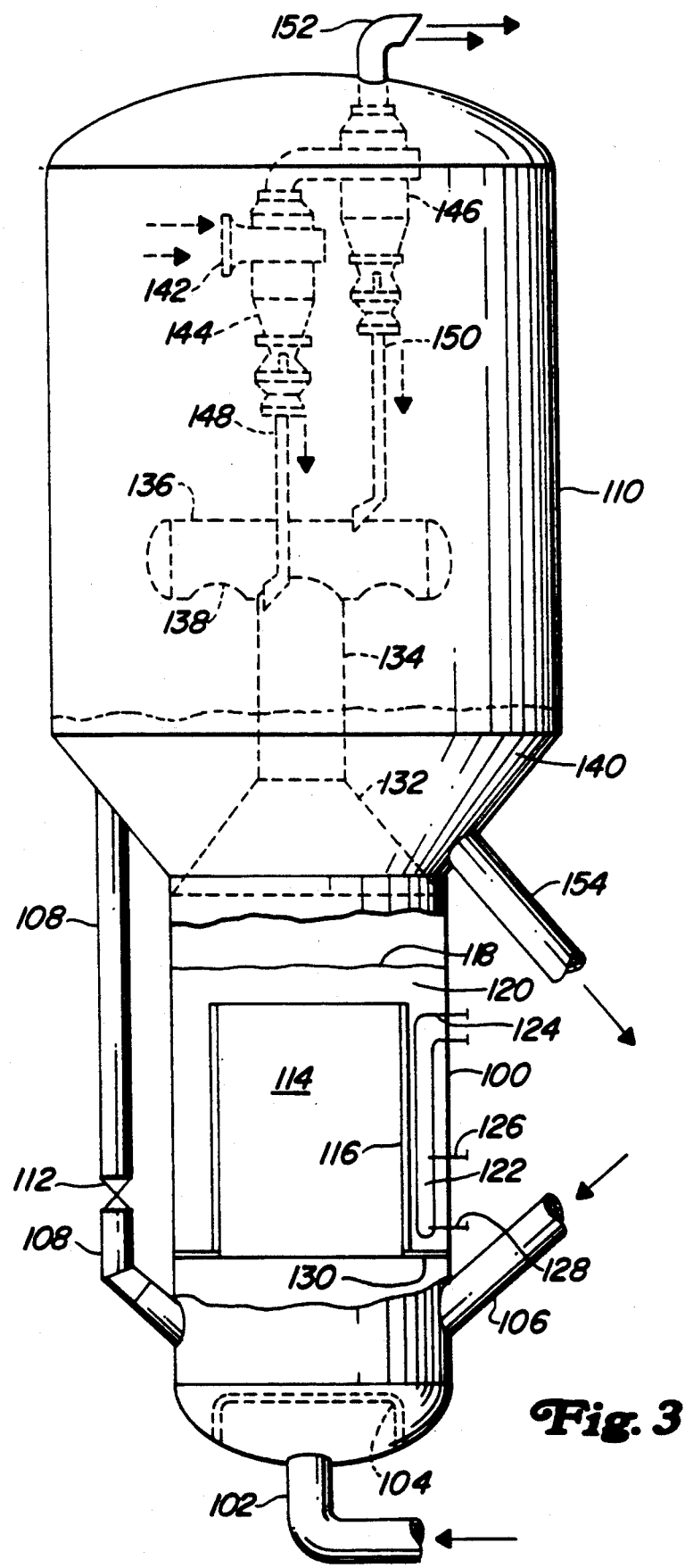
FIG. 3 is a two-zone regeneration vessel that incorporates the cooling apparatus of this invention.

FIG. 3 shows the baffle and cooling coil arrangement in another type of regenerator. The operation of regenerator with the cooling coils of this invention will be further described in the context of FIG. 3. In this regenerator operation, spent catalyst, hot regenerated catalyst and air are brought into contact to initiate regeneration. The air enters the bottom section of a regeneration vessel 100 through an air line 102. The air is distributed by a dome style air grid 104 across the bottom of regeneration vessel 100. A conduit 106 transfers spent, coke containing catalyst from a reaction zone into the regenerator vessel. A recirculation conduit 108 brings hot catalyst down from a hereinafter described upper vessel 110 at a rate regulated by a control valve 112. The hot catalyst raises the temperature of the air and spent catalyst mixture so that rapid combustion of the coke from the catalyst is initiated. As coke is combusted by-product gases of the combustion rise upwardly in vessel 100 through a combustion chamber 114. Combustion chamber 114 has cylindrical side walls formed by a baffle 116. A relatively dense mixture of catalyst extends from the bottom of vessel 100 up to an upper bed level 118. Upper bed level 118 is the approximate interface of a relatively dense catalyst phase that extends down from the upper bed level to the bottom of vessel 100. A mixture of by-product gases from the combustion of coke passes upward from the upper bed level 18 and carries with it entrained catalyst particles. Upper bed level 118 is maintained above the top of cylindrical baffle 116 and forms a relatively dense catalyst layer 120.

Cylindrical section 116 and vessel wall 100 form an annular cooling chamber 122 that extends completely around the circumference of the vessel. Circumferentially spaced cooling coils 124 are spaced at regular intervals around the circumference of annular chamber 122. An upper set of nozzles 126 and a lower set of nozzles 128 are spaced between cooling conduits 124 for distributing fluidizing gas around cooling chamber 122. The bottom of cooling chamber 122 is closed to catalyst flow by an annular plate 130. As a result, only the top boundary of the cooling chamber 122 communicates with catalyst in layer 120.

When it is desired to reduce the temperature of the catalyst in vessel 100, fluidizing gas is introduced through nozzles 128 and 126 to cause a random exchange of catalyst particles between layer 120 and cooling chamber 122. Cooling fluid circulated through cooling conduits 124 removes heat from the catalyst particles by indirect contact therewith. In the manner previously described, the amount of heat withdrawn by the cooling coils in chamber 122 and the tube wall temperatures of the cooling conduits 124 can be controlled by varying the addition of fluidizing gas through nozzles 126 and 128 and the circulation of cooling fluid through conduits 124. Again, a particularly advantageous feature of this invention is the ability to insulate the cooling coils from high temperatures within the regenerator when cooling fluid is not circulated through conduits 124. Accordingly, if for some reason the circulation of cooling fluid through the coils 124 is to be stopped, the flow of fluidizing gas to nozzles 126 and 128 is first cut off. Once the flow of fluidizing gas stops, cooling chamber 122 becomes filled with the slumped stagnant catalyst. Circulation of a small amount of cooling water through the coils will quickly cool the slumped catalyst in the cooling chamber 122. Catalyst between the cylindrical chamber 116 and the innermost section of cooling coils 124 forms an insulating layer that protects the conduit from the high temperature of the active catalyst in combustion section 114. Similarly, once the flow of fluidizing gas stops the uppermost portion of conduit 124 has a layer of insulating catalyst that extends upward in a frustoconical shape from the top of baffle 116 to the wall of vessel 100. The cooling conduits 124 can remain out of service indefinitely in this manner, without experiencing oxidation or warpage that would otherwise result form the high temperatures of the regenerator. The cooling conduits can then be brought back into service by again initiating the circulation of cooling fluid through the conduits and then fluidizing catalyst within the cooling chamber by adding fluidizing gas to nozzles 126 and 128.

The arrangement of this invention offers another advantage by providing cooled catalyst at a beneficial location. All the cooled catalyst from chamber 122 passes out of its top section into an upper portion of the catalyst bed. Providing cooled catalyst at an upper bed location prevents cooling of the catalyst at the lower bed section where spent catalyst is first contacting the air and a relatively high temperature is desired in order to rapidly initiate combustion of coke. The cooled catalyst from combustion chamber 122 only contacts the hot catalyst that is leaving the combustion chamber and has a relatively high temperature due to the combustion of coke. As the catalyst is carried upward above bed level 118 in a dilute phase, combustion of residual coke and carbon monoxide continues to occur. It is this dilute phase combustion that has often caused damage to catalyst and internals in the regenerator. By cooling the catalyst and gas mixture as it leaves the top of bed 118, excessive dilute phase temperatures are avoided without depressing temperatures in the initial coke combustion portion of the regenerator vessel.

The mixture of flue gas and entrained catalyst is directed by a frustoconical section 132 into a riser 134. Riser 134 transfers catalyst into a horizontal conduit 136 that has downwardly directed openings 138 for discharging the gas and catalyst mixture toward a dense bed 140 maintained in the bottom of upper regeneration vessel 110. Flue gas disengages from the catalyst as it is directed downwardly through openings 138. The gas and small residual amounts of catalyst are carried upward into the inlet of a set of cyclones 144, 146. Cyclones 144 and 146 separate catalyst particles from the flue gas in the manner previously described for regeneration vessel 10. Dip legs 148 and 150 return catalyst particles to the dense bed 140 as flue gas is taken overhead from the vessel through nozzle 152.

Dense bed 140 provides a reservoir of hot regenerated catalyst. A portion of this catalyst is recirculated to the bottom of vessel 100 in the manner previously described while the rest is withdrawn through a regenerated catalyst conduit 154 for continued contact with a hydrocarbon feed in an FCC reaction zone.

What is claimed is:

1. An apparatus for regenerating a fluidized catalyst by the combustion of coke and removing heat generated by said coke combustion, said apparatus comprising:
   a) a vertically elongated regeneration vessel;
   b) an at least partially cylindrical partition located inside said regeneration vessel along a vertical axis, said partition dividing the interior of said vessel into a central combustion chamber and an outer cooling chamber and said partition having a height less than the height of said vessel such that said regeneration vessel defines an upper volume in open communication with said combustion chamber and said cooling chamber in the top of said regeneration vessel and said cooling chamber having lateral sides defined by said partition comprising a plurality of vertically extended sections having overlapping vertical sides and a bottom substantially closed to catalyst flow therethrough arranged such that the only flow of catalyst between said cooling chamber and said combustion chamber is in said upper volume;
   c) u-shaped cooling coils extending vertically in said cooling chamber for circulating a cooling fluid through the interior of said coils and indirectly exchanging heat with the interior of said chamber;
   d) a regeneration gas distributor located in a lower portion of said regeneration vessel for distributing regeneration gas about said combustion chamber;
   e) a first plurality of nozzles located at a first elevation for introducing a fluidizing gas into a lower portion of said cooling chamber;
   f) a second plurality of nozzles located above said first plurality of nozzles at a second elevation for introducing fluidizing gas into said cooling chamber;
   g) a gas outlet for withdrawing fluidizing gas and stripping gas from said upper volume;
   h) a catalyst inlet for supplying coke-containing catalyst particles to said combustion chamber at a location below the top of said cooling chamber; and
   i) a catalyst outlet for withdrawing catalyst particles from said combustion chamber.

* * * * *